(12) United States Patent
Jacobsen et al.

(10) Patent No.: US 9,604,790 B2
(45) Date of Patent: Mar. 28, 2017

(54) BULK FEED

(71) Applicant: TOMRA SYSTEMS ASA, Asker (NO)

(72) Inventors: Katrin Jacobsen, Oslo (NO); Dag Windelstad, Slemmestad (NO); Lars Alfred Bech, Slemmestad (NO); Åsmund Birger Dagslet, Spikkestad (NO)

(73) Assignee: TOMRA SYSTEMS ASA, Asker (NO)

( * ) Notice: Subject to any disclaimer, the term of this patent is extended or adjusted under 35 U.S.C. 154(b) by 0 days.

(21) Appl. No.: 14/766,867

(22) PCT Filed: Feb. 10, 2014

(86) PCT No.: PCT/EP2014/052546
§ 371 (c)(1),
(2) Date: Aug. 10, 2015

(87) PCT Pub. No.: WO2014/122305
PCT Pub. Date: Aug. 14, 2014

(65) Prior Publication Data
US 2015/0375944 A1    Dec. 31, 2015

Related U.S. Application Data

(60) Provisional application No. 61/762,610, filed on Feb. 8, 2013.

(30) Foreign Application Priority Data

Feb. 8, 2013  (EP) .................................... 13154668

(51) Int. Cl.
*B65G 47/14*    (2006.01)
*B65G 47/256*    (2006.01)

(52) U.S. Cl.
CPC ..... *B65G 47/1457* (2013.01); *B65G 47/1464* (2013.01); *B65G 47/256* (2013.01);
(Continued)

(58) Field of Classification Search
CPC ............ B65G 47/1457; B65G 47/1464; B65G 47/256; B65G 2201/0235; B65G 2201/0244
(Continued)

(56) References Cited

U.S. PATENT DOCUMENTS 4,138,009 A * 2/1979 Strong ............... B65G 47/1457
                                                       198/393
4,821,920 A    4/1989 Lin et al.
(Continued)

FOREIGN PATENT DOCUMENTS

CN        1053039 A    7/1991
CN     101132976 A    2/2008
(Continued)

OTHER PUBLICATIONS

Office Action (Notification of the First Office Action) issued on Mar. 17, 2016, by the state intellectual property office of the People's Republic of China in corresponding Chinese Patent Application No. 201480007263.3, and an English Translation of the Office Action. (27 pages).
(Continued)

*Primary Examiner* — Gerald McClain
*Assistant Examiner* — Keith R Campbell
(74) *Attorney, Agent, or Firm* — Buchanan Ingersoll & Rooney P.C.

(57) ABSTRACT

A device and a method for singulation of used beverage containers received in bulk into individual containers and forwarding them towards a receiving station. The used beverage containers have different shapes and sizes. The (Continued)

device includes a rotating surface, a conveyor at least partly encircling the rotating surface and adapted to receive used beverage containers from the rotating surface and transport them away from the rotating surface; and an outer wall along the periphery of the conveyor at least along the part of the conveyor that encircles the rotating surface. The conveyor includes a first section where it is capable of receiving used beverage containers from the rotating surface, and a second section where it is only capable of transporting used beverage containers one by one and aligned with the direction of movement of the conveyor or otherwise fall back onto the rotating surface.

27 Claims, 10 Drawing Sheets

(52) U.S. Cl.
CPC ............... *B65G 2201/0235* (2013.01); *B65G 2201/0244* (2013.01)

(58) Field of Classification Search
USPC ........................................ 198/392, 396, 408
See application file for complete search history.

(56) References Cited

U.S. PATENT DOCUMENTS

| | | | | |
|---|---|---|---|---|
| 4,830,172 A | * | 5/1989 | Hilton | B65G 47/1457 198/392 |
| 4,938,082 A | * | 7/1990 | Buckley | B07C 5/02 198/392 |
| 5,065,852 A | | 11/1991 | Marti | |
| 5,299,675 A | * | 4/1994 | Schumann | B65G 47/1457 198/392 |
| 5,740,899 A | * | 4/1998 | Pugh | B65G 47/1457 198/392 |
| 8,430,228 B2 | * | 4/2013 | Herzog | B65G 47/1457 198/392 |
| 2008/0113055 A1 | | 5/2008 | Charpentier et al. | |
| 2009/0139836 A1 | | 6/2009 | Lanfranchi | |
| 2009/0308714 A1 | | 12/2009 | Charpentier et al. | |

FOREIGN PATENT DOCUMENTS

| | | |
|---|---|---|
| CN | 101177027 A | 5/2008 |
| CN | 101421174 A | 4/2009 |
| DE | 20 2005 019 112 U1 | 4/2006 |
| EP | 0 305 355 A1 | 3/1989 |
| GB | 2 184 105 A | 6/1987 |
| JP | 2003-104539 A | 4/2003 |
| WO | WO 2011/110935 A1 | 9/2011 |

OTHER PUBLICATIONS

International Search Report (PCT/ISA/210) mailed on Mar. 28, 2014, by the European Patent Office as the International Searching Authority for International Application No. PCT/EP2014/052546.
Written Opinion (PCT/ISA/237) mailed on Mar. 28, 2014, by the European Patent Office as the International Searching Authority for International Application No. PCT/EP2014/052546.

* cited by examiner

BULK FEED

FIELD OF THE INVENTION

The present invention relates to a device for receiving used beverage containers of different sizes in bulk and forwarding them individually for sorting or further processing. More particularly, the invention relates to separation of received used beverage containers, proper placement of individual containers on a conveyor, and transportation on the conveyor toward a destination where they will be sorted, or otherwise processed.

BACKGROUND OF THE INVENTION

Devices adapted to receive objects in bulk and forward them for individual processing are used for example for receiving and registering and/or sorting used beverage containers. When the items that are processed display a wide range of sizes, shapes and weights, existing devices may end up forwarding several items together rather than individually, and some items may not be forwarded at all, but remain in the area of the device where the items are received in bulk, necessitating manual correction by an operator.

The present invention embodies features that are designed to alleviate or overcome these shortcomings and to obtain further advantages.

SUMMARY OF THE INVENTION

The present invention provides a device for singulation of used beverage containers received in bulk into individual containers, where the used beverage containers have different shapes and sizes, including a first size and a second size, which second size is larger than the first size. The used beverage containers typically have an elongated shape; they can for example be substantially cylindrical. The device for singulation of containers may include a rotating surface adapted to receive a plurality of used beverage containers and to distribute them towards the periphery of the rotating surface. A conveyor can be provided such that it at least partly encircles the rotating surface and it may be adapted to receive used beverage containers from the rotating surface and transport them away from the rotating surface. The conveyor has an inner edge, an outer edge and a supporting surface which extends between the inner and outer edges. The supporting surface supports the used beverage containers during transport. The inner edge is arranged closer to the rotating surface than the outer edge, i.e. the inner edge is arranged between the supporting surface and the rotating surface when viewed from above.

An outer wall is provided along the periphery or outer edge of the conveyor at least along the part of the conveyor that encircles the rotating surface. This arrangement implies that the conveyor is arranged between the outer wall and the rotating surface.

The conveyor gradually ascends such that it is lower than or substantially at the same level as the rotating surface in a first section, allowing the used beverage containers to leave the rotating surface and enter the conveyor in the first section, and such that it is at a higher level than the rotating surface in a second section.

A peripheral barrier is usually arranged along the periphery of the rotating surface. Such a peripheral barrier prevents the used beverage containers from leaving the rotating surface in the second section. The peripheral barrier can be a wall extending between the conveyor and the rotating surface. It should be noted that embodiments in which no peripheral barrier is arranged along the periphery of the rotating surface, or where one or more peripheral barriers is/are only partly arranged along the rotating surface are conceivable. The used beverage containers may, in other words, leave the rotating surface on one or more conveyors.

In at least a part of the second section the conveyor is preferably made so narrow that the used beverage containers are only able to remain on the conveyor if they are transported one by one and aligned with the direction of movement on the conveyor. Otherwise they will fall off the conveyor back onto the rotating surface or on another conveyor.

By a container being aligned with the intended direction of movement of the conveyor is here meant that the axis along which the container has its largest extension is substantially aligned with that direction. Typically, the second section is arranged so that the used beverage containers, which fall of the conveyor, fall back onto the rotating surface. However, according to some embodiments, the second section is arranged so that the used beverage containers, which fall of the conveyor, can fall onto a different section of the conveyor, or onto another conveyor, that transports the containers back to the rotating surface or somewhere else.

In the first section the conveyor may be between 30 mm higher and 50 mm lower than the rotating surface. After that the conveyor may ascend at an angle that is between 0.1 and 10 degrees, or in some embodiments at an angle between 0.1 and 45 degrees.

In some embodiments the conveyor tilts downwards in a direction radially away from the rotating surface in the first and/or second section with an angle between 0.1 and 15 degrees, alternatively between 1 and 10 degrees, between 2 and 8 degrees or between 6 and 8 degrees. The angle can be about 7 degrees. By this arrangement, a point on the outer edge and the opposite point on the inner edge are separated along the vertical direction, the point on the outer edge being below the point on the inner edge. The transition between a flat section and a tilted section is normally gradual. In one embodiment the tilt of the first section is 0 degrees and the tilt of the conveyor gradually increases until the tilt at the second section is 7 degrees.

According to one example the device is adapted to handle used beverage containers of a first size corresponding to those containers having the smallest diameter which the device is adapted to handle. Further, the device is adapted to handle used beverage containers of a second size corresponding to those having the largest diameter which the device is adapted to handle. Furthermore, the device is adapted to handle used beverage containers of a third size corresponding to those having the smallest height which the device is adapted to handle. The used beverage container of said first and third size may be one and the same type, i.e. the beverage container having the smallest diameter may also be the one being the shortest.

According to some embodiments, the used beverage containers of the first size have a diameter which is smaller than the diameter of the used beverage containers of the second size. Furthermore, in at least a part of the second section the conveyor is made narrow in at least part of the second section by a guiding element forming a narrowing wall which extends along the outer edge of the conveyor and across the conveyor so as to gradually force used beverage containers of the first size towards the inner edge of said conveyor. The narrowing guide can have any length, e.g. between 1 and 3 m, or between 1 and 2 m or be between 25 cm and 1 m, or between 25 cm and 75 cm along the outer edge of the conveyor, for example for about 50 cm or about 90 cm, and is typically attached to the outer wall. The narrowing wall extends away from the outer edge and partially across the conveyor, thereby leaving less room for at least some containers to pass through. The maximum extension of the narrowing wall across the conveyor can be fixed or adjustable, for example manually adjustable. The maximum extension of the narrowing wall across the conveyor can be such that the centre of mass of the used beverage containers of the second size remains inside the width of the conveyor. The "width" of the container is here measured along a direction which is perpendicular to the intended direction of movement of the conveyor and parallel with the supporting surface.

The guiding element may comprise a minor wall which reduces the width of the conveyor so much that two of the used beverage containers of the first size cannot be positioned side by side between the minor wall and the inner edge of the conveyor.

The minor wall can be arranged in the space between the support surface of the conveyor and the outer surface of a passing used beverage container of the second size having a circular or elliptical cross section, such that the minor wall does not interact with the used beverage containers of the second size. The minor wall normally gradually reduces the size of the conveyor along the length of the guiding element, such that a container lying beside another container on the conveyor are forced off the conveyor, at least at the end of the guiding device.

The smallest distance between the minor wall and the inner edge of the conveyor can be in the range from about $d_{min}/2$ to about $1.5 \times d_{min}$, or from $d_{min}/2$ to smaller than $1.5 \times d_{min}$, or from $d_{min}$ to smaller than $1.4 \times d_{min}$ the distance being measured in a direction perpendicular to the intended direction of movement of the conveyor, and $d_{min}$ denoting a largest diameter of the containers of the first size. The container may be substantially cylindrical, and $d_{min}$ the largest diameter of that cylinder. Additionally, the minor wall and the inner edge of the conveyor can be in the range from $d_{min}/2 \cos \alpha$ to about $1.5 \times d_{min}/2 \cos \alpha$, or from $d_{min}/2 \cos \alpha$ to smaller than $1.5 \times d_{min}/\cos \alpha$, or from $d_{min}/\cos \alpha$ to smaller than $1.4 \times d_{min}/\cos \alpha$. At the same time the length of the conveyor, between inner and outer edge is at least $d_{max}/2$ or $d_{max}/(2 \cos \alpha)$, or at least $0.7 \times d_{max}$, or at least $0.7 \times d_{max}/\cos \alpha$, or at least $0.85 \times d_{max}$ or at least $0.85 \times d_{max}/\cos \alpha$, $d_{max}$ denoting a largest diameter of the containers of the second size, such that the largest container are able to pass.

The guiding element may comprise a surface which is integrated with the minor wall and extends from the minor wall upwards towards the outer edge of the conveyor. The surface can be curved, and may be concave towards a container lying on the conveyor.

An additional guiding device can be attached to the outer wall above the conveyor in the second section above the conveyor. The guiding device may have an edge adapted to force or push used beverage containers that are standing or stacked on top of each other on the conveyor inwards toward the rotating surface until they fall off the conveyor.

The guiding device can have a guiding edge which extends across the conveyor. The extension of the guiding edge preferably increases in the intended direction of movement of the conveyor. The distance between the projection of the guiding edge onto the supporting surface and the outer edge can be such that upright containers of the cannot pass through. For example, the distance can be about $d_{min}/2$.

The distance between the guiding edge of the guiding device and the supporting surface of the conveyor can increase in the intended direction of movement of the conveyor, the distance being measured along an axis that is substantially perpendicular to the width of the conveyor and to the intended direction of movement of the conveyor. The increase can for example be between 0.1 and 40 degrees, or between 10 and 30 degrees or between 20 and 25 degrees.

According to some embodiments, the length of the used beverage containers having a first size is shorter than or equal to the diameter of the used beverage containers having a second size, and a front end of the guiding edge is arranged sufficiently close to the supporting surface of the conveyor to enable the guiding edge to interact with a portion of a used beverage container of the first size which is standing. The front end of the guiding edge is also arranged sufficiently close to the supporting surface of the conveyor to make the guiding edge interact with a portion of a used beverage container of the second size which is lying down. In addition, in these embodiments, a retaining element e.g. a curtain or wall may be arranged adjacent to a back end of the guiding edge to guide used beverage containers of the second size which is lying down back towards the outer wall of the conveyor before the used beverage container of the second size is forced off the conveyor by the guiding element.

The retaining element may help guide containers that are pushed by the guiding device back towards the conveyor if they have not fallen off the conveyor when they reach the retaining element. This will help retain large containers that are lying on their side on the conveyor while smaller containers that are standing or that are stacked on top of each other will fall off and back onto the rotating surface before they reach the retaining element. The retaining element can be made of a flexible material, for example rubber, or a rigid material such as plastic.

The retaining element can be arranged immediately following the guiding device in the direction of intended movement of the conveyor. Alternatively, the retaining element and the guiding device are separated in the direction of intended movement of the conveyor. Alternatively, the retaining element and the guiding device are overlapping each other in the intended direction of movement of the conveyor. The appropriate distance typically depends on the sizes and shapes of the used beverage containers to be handled.

In other words, in a side view, the retaining element may overlap the guiding device, may be arranged immediately after the guiding device, or be arranged a distance apart from the guiding device. In a top plan view, the retaining element can be arranged at an angle relative to a tangent to the inner edge so that, in the direction of intended movement of the conveyor, the retaining element extends from outside the supporting surface to above the supporting surface. The angle can for example be between 0 and 45 degrees, alternatively between 15 and 35 degrees. The angle can be approximately 25 degrees. In other words and according to one example, since in some embodiments the device may be configured to handle a range of objects where the largest objects have a larger diameter than the height of some of the smallest objects, this additional guiding device can be immediately followed by a curtain which can be arranged at an angle between zero and 45 degrees relative to the inner edge of the conveyor, alternatively at an angle between 15 and 35 degrees, or at an angle of 25 degrees.

Furthermore the guiding element, the guiding device and/or the retaining element can be dynamic, i.e. they can be automatically projected and withdrawn depending on the type of container that is approaching. The type of container that is approaching is determined by sensors arranged e.g. at the conveyor.

According to one aspect of the invention a sensor capable of detecting used beverage containers may be arranged at the end of the conveyor. This sensor provides signals to a control system configured to receive input from the sensor and from a receiving station.

Based on the received input the control system can control the device to stop the conveyor if a used beverage container is detected at the end of the conveyor and the receiving station signals that it is not ready to receive containers, and to run the conveyor at nominal speed if there is no used beverage container at the end of the conveyor or the receiving station signals that it is ready to receive used beverage containers. The control system may also be configured to run the conveyor at high speed if no used beverage container has been detected at the end of the conveyor within a predetermined time period.

In some embodiments of the invention, a second conveyor can be arranged to receive used beverage containers from the first conveyor and transport them at a speed that is higher than the nominal speed of the first conveyor. This will help create greater distance between the containers before they reach the receiving station.

In embodiments with two conveyors, sensors capable of detecting used beverage containers can be arranged at the end of the first conveyor, and at the end of the second conveyor. A control system may then be configured to receive input from the sensors and from a receiving station, and to control the device to stop the first conveyor if a used beverage container is detected at the end of the first conveyor and the second conveyor is not running, to run the first conveyor at nominal speed if the second conveyor is running, to stop the second conveyor if a used beverage container is detected at the end of the second conveyor and the receiving station signals that it is not ready to receive used beverage containers, and to run the second conveyor at nominal speed if there is no used beverage container at the end of the second conveyor or if the receiving station signals that it is ready to receive used beverage containers, or both. The control system may also be configured to run the first conveyor at high speed if no used beverage container has been detected at the end of the first conveyor within a predetermined time period.

According to another aspect of the invention, which can be implemented in embodiments with one conveyor as well as embodiments with two conveyors, a sensor capable of detecting used beverage containers may be arranged in the first section of the first conveyor. The control system may then be configured to run the rotating surface at high speed if no used beverage container has been detected in the first section of the conveyor within a predetermined time period. This can help bring containers over from the rotating surface and to the conveyor when fewer containers remain on the surface.

The invention also provides a method for singulation of used beverage containers received in bulk into individual containers, where the used beverage containers have different shapes and sizes. Such a method may utilise a device for singulation of used beverage containers, particularly a device with a rotating surface, a conveyor at least partly encircling the rotating surface and adapted to receive used beverage container from the rotating surface and transport them away from the rotating surface, and an outer wall along the periphery of the conveyor at least along the part of the conveyor that encircles the rotating surface, and wherein the conveyor includes a first section where it is capable of receiving used beverage containers from the rotating surface, and a second section where used beverage containers can only be transported one by one and aligned with the direction of movement of the conveyor or otherwise fall back onto the rotating surface.

The method may include receiving a plurality of used beverage containers on top of the rotating surface, rotating the surface such that the used beverage containers are distributed towards the periphery of the surface and enter the conveyor in the first section, and running the conveyor such that used beverage containers that are positioned one by one and aligned with the direction of movement on the conveyor are transported away from the rotating surface and towards a receiving station, and used beverage containers that are not positioned one by one and aligned with the direction of movement on the conveyor fall back onto the rotating surface.

According to one aspect of the invention the method may include stopping the conveyor if a used beverage container is detected at the end of the conveyor and the receiving station signals that it is not ready to receive used beverage containers, and running the conveyor at nominal speed if there is no used beverage container at the end of the conveyor or the receiving station signals that it is ready to receive used beverage containers.

According to another aspect of the invention, the method may include running the conveyor at high speed if no used beverage container has been detected at the end of the conveyor within a predetermined time period.

Some embodiments of a method according to the invention may be implemented utilizing a device with two conveyors as described above. The method may then include stopping the first conveyor if a used beverage container is detected at the end of the first conveyor and the second conveyor is not running; running the first conveyor at nominal speed if the second conveyor is running; stopping the second conveyor if a used beverage container is detected at the end of the second conveyor and the receiving station signals that it is not ready to receive used beverage container, and running the second conveyor at nominal speed if there is no used beverage container at the end of the second conveyor or if the receiving station signals that it is ready to receive used beverage containers, or both. The method may also include running the first conveyor at high speed if no used beverage container has been detected at the end of the first conveyor within a predetermined time period.

The method may include running the rotating surface at high speed if no used beverage container has been detected in the first section of the conveyor within a predetermined time period.

In all embodiments described above detection of used beverage container can be performed using various types of sensors, for example optical, metal detectors, weight detectors. The selection of a preferable type (or types) of sensors may have to be based on the characteristics of the range of used beverage containers to be processed in a particular implementation. The method may be performed using a control system, for example a computerized control system, PLC or some other type of control system known in the art.

BRIEF DESCRIPTION OF THE DRAWINGS

These and other characteristics of the invention will become clear from the following description of a preferential form of embodiment, given as a non-restrictive example, with reference to the attached drawings, wherein.

DETAILED DESCRIPTION OF AN EXEMPLARY EMBODIMENT

In this document, used beverage containers may also be referred to as objects. A device for receiving objects in bulk and forwarding them individually for further processing may, in accordance with the principles of the invention, include one or more rotating surfaces configured for receiving the used beverage containers and for distributing them towards the periphery of the rotating surface where they will be transferred to one or more conveyor belts. The process of separating objects for individual forwarding and processing will be referred to as singulation.

The conveyor belt may transport the objects toward a station, such as a machine or apparatus for sorting, counting, recording, evaluating, storing or recycling. The device may include features for separating objects and for controlling the motion of the rotating surface and the conveyor belt or belts, as described in further detail below. It will be understood by those with skill in the art that for the sake of brevity the various features described in combination in the exemplary embodiments are not necessarily dependent on each other, and that other combinations of features are intended to be covered by this description even if they are not explicitly described.

Figure 1:
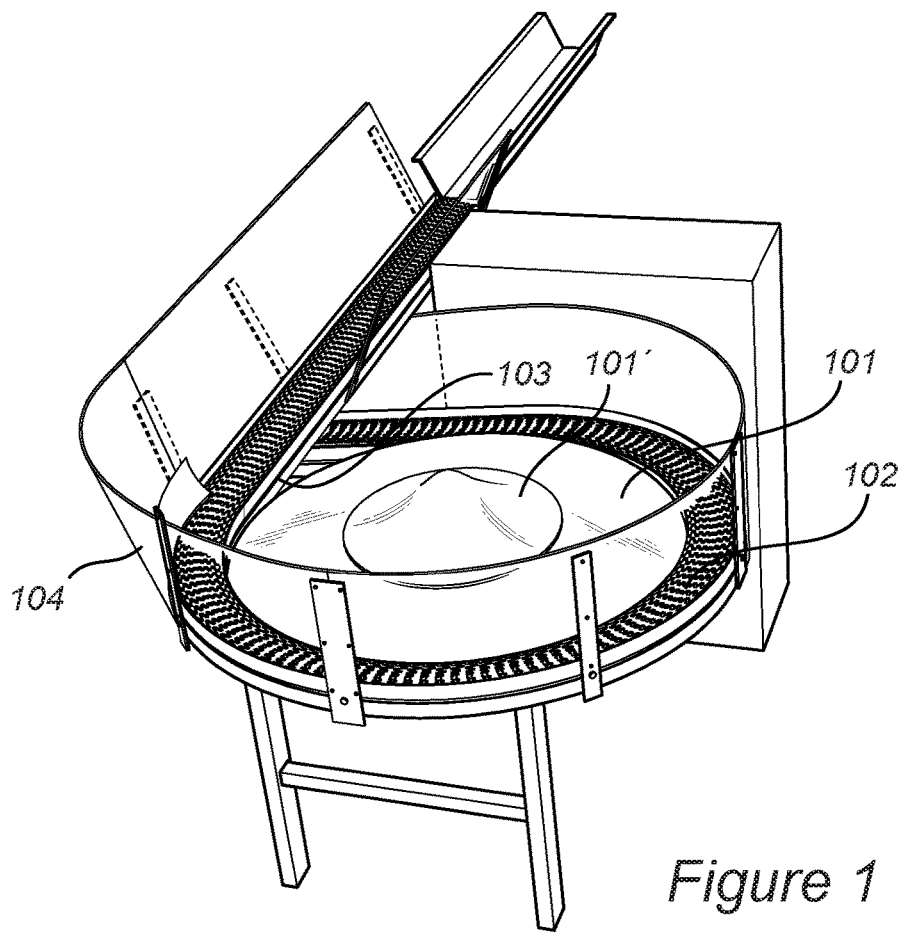
FIG. 1 shows an embodiment of the invention.

FIG. 1 shows a device comprising a circular rotating surface 101 that is substantially horizontal or slightly conical, descending toward the periphery of the surface. Arranged around at least a part of the periphery of the rotating surface 101 there is a conveyor 102 arranged such that objects that leave the rotating surface as a result of the rotation, will end up on the conveyor 102. The remaining part of the rotating surface is encircled by a peripheral barrier 103 which prevents objects from leaving the rotating surface. The peripheral barrier 103 may be made from a material with low surface friction, for example steel. Other materials may, however, also be chosen, for example aluminium or a suitable plastic material.

The conveyor 102 may be a modular conveyor belt, which is suitable for arranging it along a curve following the periphery of the rotating surface 101. The conveyor 102 may be lower than or substantially at the same level as the rotating surface in a first section where the conveyor belt 102 is adapted to receive the objects from the rotating surface 101. In a second section it may gradually ascend to a higher level such that the conveyor belt 102 constitutes part of the peripheral barrier preventing objects from leaving the rotating surface in the second section.

Along the second section, where the conveyor 102 is adjacent to, but higher than the rotating surface, additional features are arranged to reject objects that are not properly placed on the conveyor such that they fall back onto the rotating surface 101. These features will be discussed in further detail below. Objects that are not rejected are transported by the conveyor 102 from the rotating surface 101 and towards a receiving station for further processing.

The rotating surface 101 can be designed in different ways. For example, it may be a flat, horizontally arranged rotating surface, or a surface that is cone shaped, convex or concave, descending or ascending towards the periphery of the surface. The preferred shape of the surface may have to be determined based on the characteristics of the objects and the desired throughput as determined for example by the capacity of the receiving station. The surface may be rotating in the same direction as the conveyor 102. However, in some embodiments the direction of rotation may be opposite to the forward direction conveyor 102. At the center of the rotating surface 101 an additional circular rotating surface 101' may be provided. This additional rotating surface 101' may be designed with a steeper (or flatter, or even concave) conical shape than the first rotating surface 101, it may have a different surface friction than the first rotating surface 101, and it may rotate at a different speed, either adjustably under the control of a control system and a separate motor, or fixed through the use of the same motor as the one that drives the first rotating surface 101 and a gearbox. The manner in which the additional rotating surface 101' differs from the first rotating surface 101 can be utilized if, as a design choice, it is desirable to distribute objects toward the periphery more or less rapidly. The rotating surface is driven by a first motor (not shown) which may, for example, be provided under the rotating surface 101. The speed and directions of circular rotating surfaces can be controlled by a control system connected to the motor. The control system will be described in further detail below.

The device further comprises vertical walls 104. The walls enclose the device along the outer periphery of the conveyor 102, leaving an opening for receiving objects, for example used beverage containers, in bulk for example from above and onto the rotating surface 101. Like the peripheral barrier 103, the walls 104 may be made from a material with low surface friction, for example steel. Other materials may, however, also be chosen, for example aluminium or a suitable plastic material.

Figure 2:
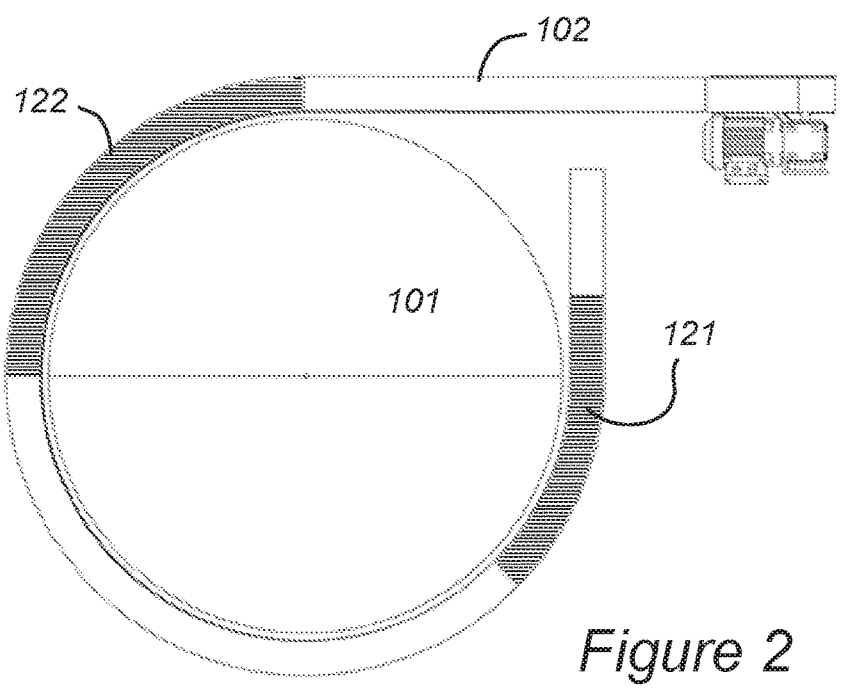
FIG. 2 shows a top view of an embodiment of a conveyor belt.

Reference is now made to FIG. 2, which shows an embodiment illustrating the arrangement of the conveyor 102 around the periphery of the rotating surface 101. According to this embodiment, the conveyor 102 is constituted by a modular conveyor belt which allows the conveyor 102 to curve along a part of the circular rotating surface 101. The conveyor belt is driven by a second motor (not shown). The speed and direction of the conveyor belt can be controlled by a control system connected to the second motor. The control system will be described in further detail below. According to this embodiment, the conveyor belt is looped. The upper sections of the conveyor belt leads to the processing machine and turns back underneath the upper section leading back to the beginning of an entry section. Other configurations of the conveyor belt are possible within the scope of the invention.

The relationship between the conveyor 102 and other parts of the device differ at different sections. A first entry section 121, where the conveyor 102 is lower or substantially at the same level as the rotating surface, allows the objects on the rotating surface 101 to enter the conveyor 102. The entry section 121 is followed by a separation section 122. It must be understood that the entry section 121 and the separation section 122 may be overlapping. The separation section 122 of the conveyor 102 gradually ascends to a higher level such that the height of the conveyor 102 prevents new beverage containers from entering the conveyor 102 in the separation section 122. Consequently, there may be an overlapping section where objects may still enter the conveyor 102, but where this becomes gradually more difficult due to the increased elevation of the surface of the conveyor 102, and where objects may also fall off the conveyor 102 and back down on the rotating surface 101.

In the separation section 122 the conveyor is part of a peripheral barrier encircling part of the rotating surface 101. In order to achieve separation, it is desirable to only allow objects to remain on the conveyor if they are transported one by one and aligned with the direction of movement of the conveyor. The conveyor 102 may therefore be configured such that at least towards the end of the separation section 122 it is or becomes so narrow that objects that are side by side on the conveyor 102 or that are not aligned with the direction of motion will fall back onto the rotating surface 101.

Figure 3:
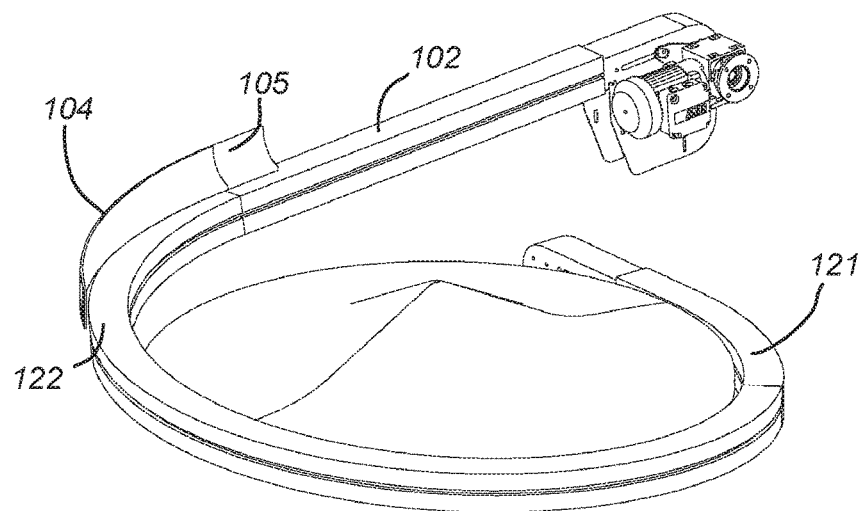
FIG. 3 shows a perspective view of an embodiment of a conveyor belt.

This narrowing can be achieved by way of a combination of one or more features. FIG. 3 shows an embodiment where a section of the outer wall 104 curves inward just above the conveyor 102, decreasing the width of the conveyor 102. The curved section 105 forms a guiding wall along the outer edge of the conveyor 102 which gradually narrows the width of the conveyor 102. The curved section 105 may be an integral part of the outer wall 104, or it may be a separate part attached to the outer wall 104, and made from a suitable plastic or metal, for example aluminium or steel. The surface friction of the curved section 105 must be sufficiently low to allow objects to be transported easily in direction of motion of the conveyor 102 without being interrupted or stuck. In some embodiments the curved section 105 curves inward towards the rotating surface 101 while the conveyor tilts slightly outward such that the conveyor 102 and the curved section 105 together form a slight V-shape in cross section. The width of the conveyor 102 at its narrowest part and the shape of the curved section 105 must be determined based on the sizes and shapes of the objects that will be processed by the device. At its most narrow, the conveyor 102 in combination with the curved section 105 must be sufficiently narrow to prevent two of the smallest objects it is designed to handle to remain on the conveyor side by side. This may also help prevent the smallest objects from being positioned at an angle other than parallel to the direction of movement. At the same time the conveyor must be sufficiently wide to allow the largest objects it is designed to handle to remain on the conveyor without falling back onto the rotating surface 101.

Figure 4:
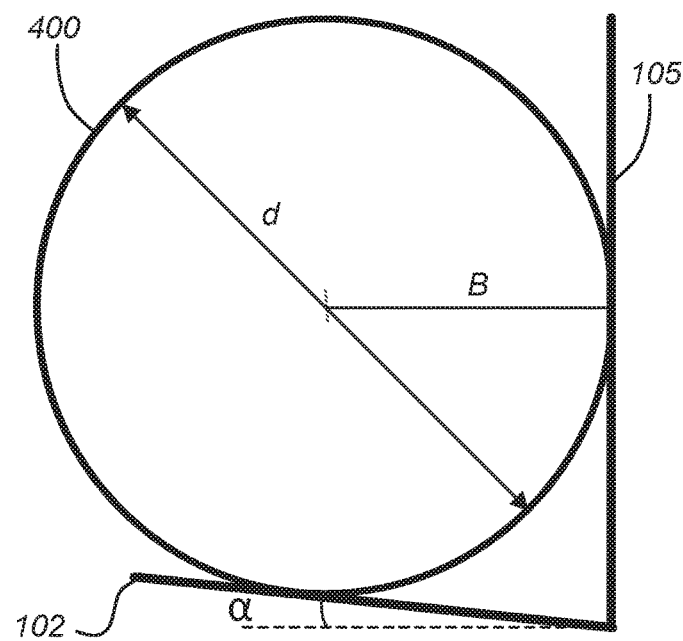
FIG. 4 shows the relationship between the size of an object on the conveyor and the width of the conveyor.

Reference is now made to FIG. 4, which shows a cross-sectional view of the separation section 122. In order for an object not to fall off the conveyor 102, the centre of mass of the object must be within the width of the conveyor 102. The separation section 122 is therefore constructed such that only one object should be able to have its centre of mass within the width of the conveyor 102.

In FIG. 4 this width is shown as A, while the diameter of an object 400 positioned on the conveyor is shown as d. For objects that do not have a circular cross-section, their largest crossectional dimension may be substituted for the diameter. In order to prevent the objects from simply rolling off the conveyor 102, the conveyor belt may be tilted outwards with an angle $\alpha$, and the width of the conveyor and that of the conveyor belt L will then be given as A=L $\cos(\alpha)$. Because of the outward tilt of the conveyor belt the object will be in contact with the peripheral wall of the guiding device 105, and given that the object has a substantially circular cross-sectional shape, its centre of mass will be at a distance B from the peripheral wall 104, where B equals the crossectional radius of the object, or d/2. In other words, any object for which A>B is fulfilled will have its centre of mass inside the width of the conveyor and will not fall off the conveyor and back onto the rotating surface.

Figure 5A:
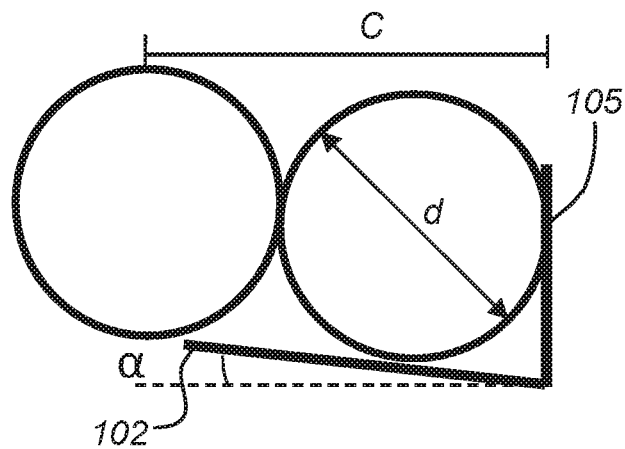
FIGS. 5a to 5b show the relationship between the size of small objects arranged side by side on a conveyor and the width of the conveyor.

Turning now to FIG. 5a, it can be seen that in order to ensure that if two objects are positioned next to each other, the one closest to the rotating surface should not have its centre of mass within the width of the conveyor. Assuming the two objects have the same diameter, the centre of mass of the innermost object should be at a distance C from the peripheral wall, where C=1.5 d. It will be realized that the assumptions holds if both objects have the minimum size the device is configured to handle, and that if any one of them (or both) are larger than this minimum size, the innermost object will have its centre of mass even further from the guiding device 105.

Figure 5B:
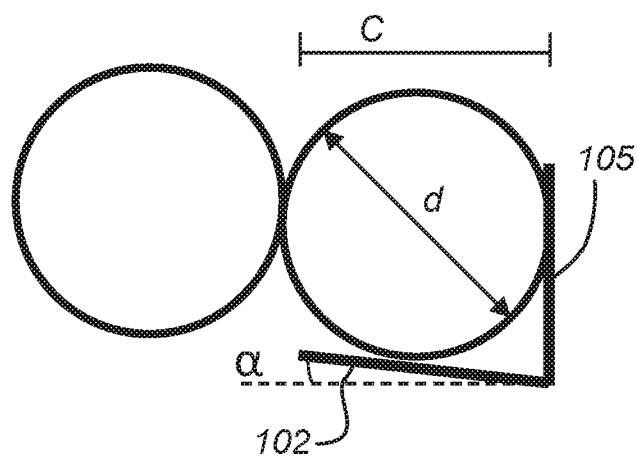

However, in applications where the objects may have irregular or unpredictable shapes, for example in the case of returned beverage containers which may include aluminium cans that may have been deformed, it may be desirable to choose a different value for C. FIG. 5b illustrates an example where C has been chosen to be equal to the diameter of the outermost container. In other words, in this example the design parameter is not that the centre of gravity of the innermost container should be at a distance C from the peripheral wall, but that the entire innermost container should be at a distance C from the peripheral wall, which means that C=d. Other multipliers may also be chosen (for example C=1.2 d, or C=1.4 d, as a tuning parameter.)

Based on the considerations discussed with reference to FIG. 4 and FIG. 5 it can be seen that we have the following requirements, namely $$A>B \text{ for all objects; and}$$

$$A<C \text{ for all objects.}$$

Furthermore, it will be realized that the first requirement depends on the largest objects (even the largest objects should be able to pass without falling off), while the second requirement depends on the smallest objects for which the device is configured to handle (even the smallest objects should be unable to pass side by side). It will readily be realized that if the range of sizes of objects is sufficiently large, it will be impossible to satisfy both requirements at once. In particular, if is chosen be equal to the diameter of the smallest objects, the requirements become $$A>d_{max}/2; \text{ and}$$

$$A<d_{min}.$$

This cannot be fulfilled if $d_{max}/2 \geq d_{min}$.

In order to be able to design devices that are consistent with the principles of the present invention and that are able to handle a wider range of objects than this limitation allows, certain embodiments of the invention provides a guide which provides a second peripheral wall which is provided inside the outer wall 104, but which is sufficiently low to only interfere with the smallest objects. This principle will now be explained in further detail with reference to FIG. 6.

Figure 6:
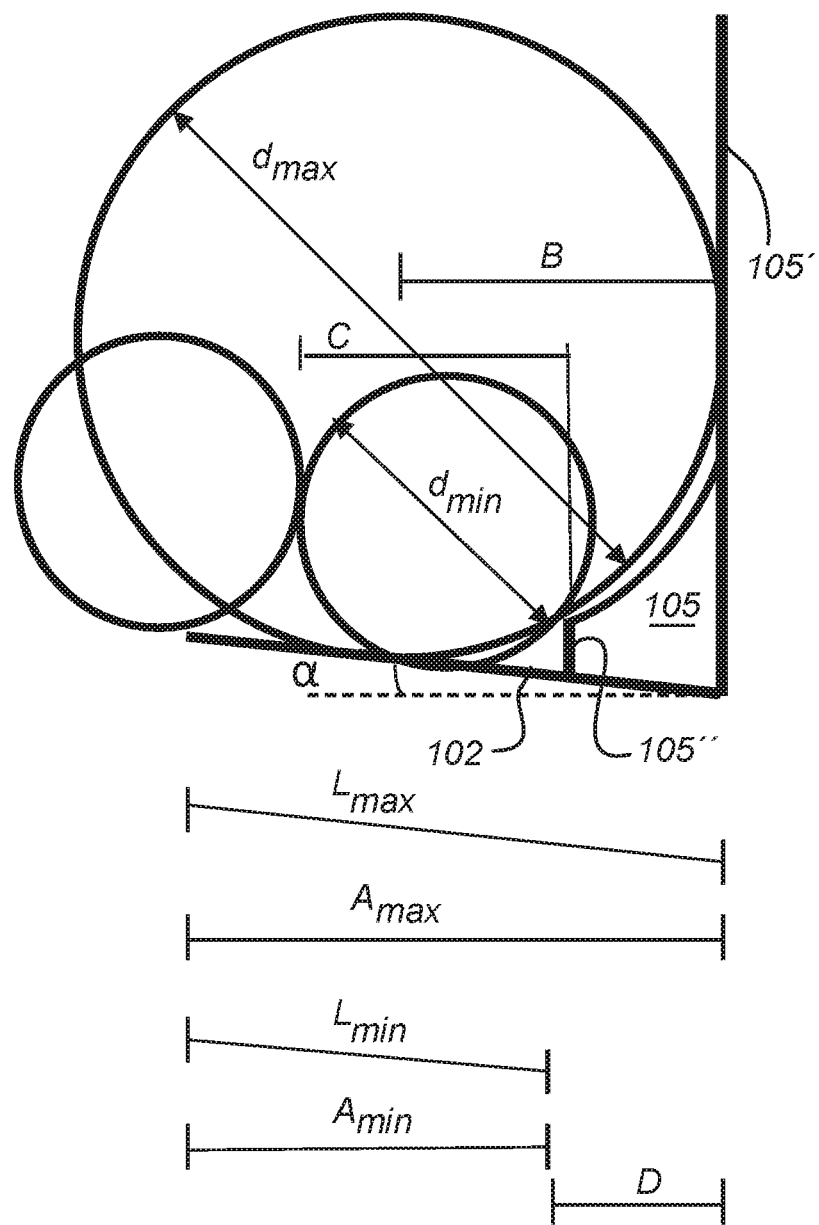
FIG. 6 shows the relationship between the size of objects, the width of the conveyor and a guiding device.

In FIG. 6 the width of the conveyor as measured from the outer wall of the guiding device 105' is shown as $A_{max}$. The distance from the outer wall to the centre of mass for the largest objects is shown as B. If the largest containers have a diameter of $d_{max}$ this means that the first design parameter becomes $$A_{max} > d_{max}/2.$$

Similarly, the second design parameter is $$A_{min} < d_{min},$$

assuming that C is chosen equal to $d_{min}$, as discussed above. In this case, however, the two are measured with respect to two different outer walls 105', 105". Since they are both measured from the inner edge of the conveyor, this means that the minor wall 105", henceforth referred to as the second outer wall, must be positioned at a distance $D=A_{max}-A_{min}$ from the first outer wall 104. This, again, means that the distance D must fulfil the requirement $$D \geq d_{max}/2 - d_{min}.$$

This places a practical limitation on the range of sizes which a device can be designed for. Since the second outer wall 105" shall not interfere with the largest container, a theoretical limitation on $d_{max}/2$ is that it is equal to D, which would give $d_{min}=0$. However, this would give a second outer wall with zero height. How high the second outer wall 105" needs to be may depend on the shape and weight of the containers (the smallest containers should not be able to "climb" up on the wall), and it may be necessary to determine this as part of the configuration of the device, taking the particulars of a given application into consideration.

It will be realized, and can be seen from FIG. 6, that the upper edge of the second outer wall 105" is limited by the outer surface of the largest objects for which the device is configured, and a guide establishing the second outer wall 105" can be shaped with a curved surface with substantially the same radius and centre as the largest objects, and which curves from the upper edge of the second outer wall 105" and up to the inner surface of the first outer wall 105'.

It should be noted that the first design parameter also applies to the second outer wall 105" such that $$A_{min} > d_{min}/2.$$

Otherwise the smallest objects will fall off the conveyor and back onto the rotating surface.

In addition to the width of the conveyor, adjustments may be made to the curvature of the curved section of the guiding device 105 and the degree of tilt α of the conveyor 102. The angle α should be at least approximately 1°.

Since different implementations of the invention may be designed to handle very different ranges of sizes and shapes, a general design specifications must be left as design criteria to be determined based on the guidelines presented above.

Figure 7:
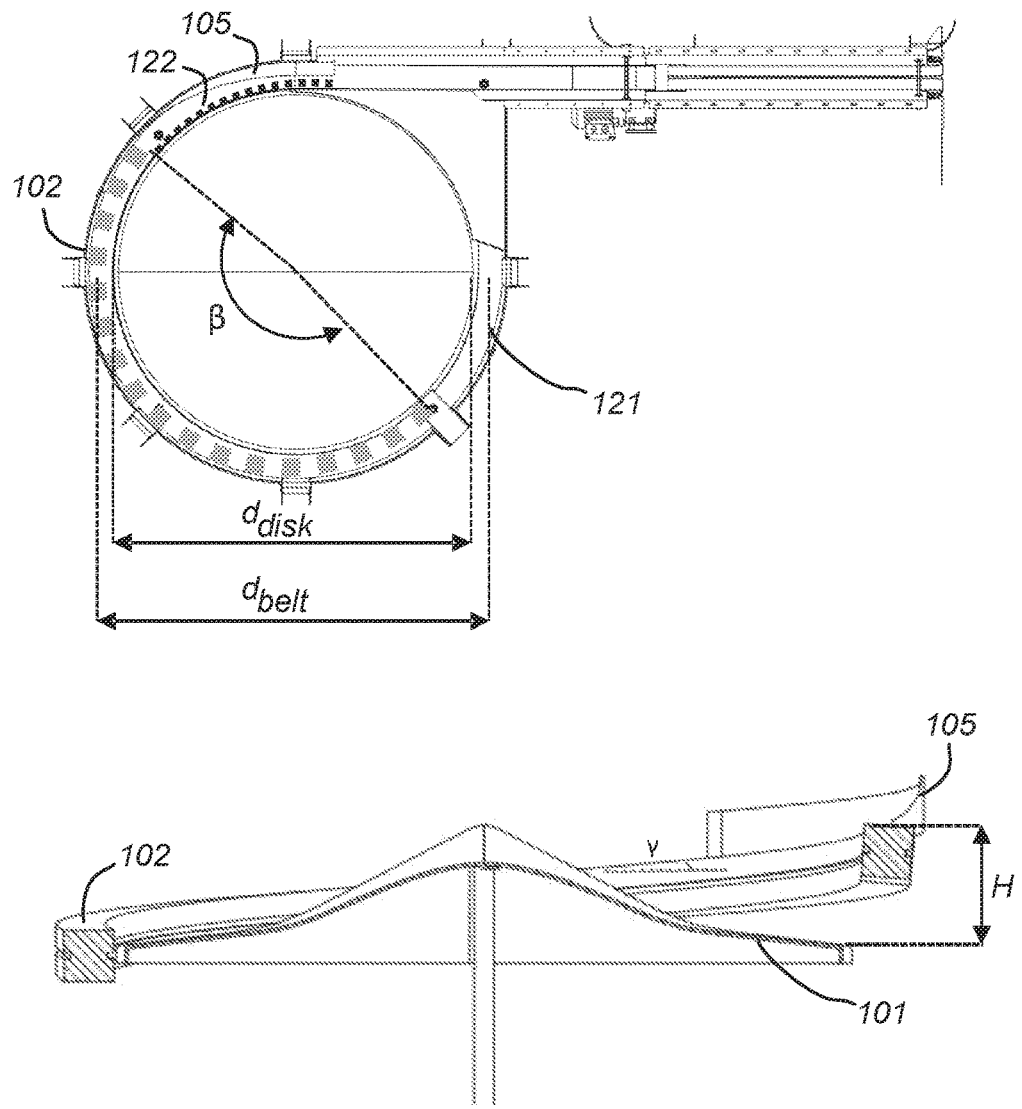
FIG. 7 shows a top view and a side view of a an embodiment illustrating the ascension of the conveyor from a lower to a higher level.

In order to ensure that objects can fall freely from the separation section 122 and back onto the rotating surface 101 without being prevented therefrom by objects already on the rotating surface, the separation section must have a minimum height above the rotating surface at least equal to the diameter of the largest objects. FIG. 7 illustrates how this height is a function of the various dimensions of the device.

In FIG. 7, which shows two different views of a device according to the invention, the conveyor 102 encircles the rotating surface 101 at least partly, as already described. The conveyor 102 rises at an angle γ from a first level which is substantially the same as that of the rotating surface 101 until it reaches the necessary height H in the separation section. The conveyor 102 rises from being at the same level as the rotating surface 101 somewhere in the entry section 121, and travels around the rotating surface through an angle β until it reaches the necessary height H in the separation section 122.

For the sake of simplicity it is assumed that the angle β is measured from the point where the conveyor belt is more or less exactly at the same level as the rotating surface. It will be realized by those with skill in the art that the conveyor belt may be somewhat lower (or higher) than the rotating surface at the point from which β is measured, in which case the difference in height must be corrected for.

Taking the diameter of the circular shape of the conveyor belt, $d_{belt}$, into consideration, the length at which the conveyor inclines at the angle γ can be found as $$L = 2\pi(d_{belt}/2)i = \pi d_{belt} i$$

Where $i=\beta/360°$. This means that given the largest object diameter $d_{max}$ and given a conveyor belt diameter $d_{belt}$, the angle γ must be chosen to fulfil $$H = L \sin(\gamma) > d_{max}.$$

The diameter $d_{belt}$ is of course only slightly larger than the diameter of the rotating surface, $d_{disk}$, and the diameter of the surface determines the capacity of the device. (Capacity in the sense of capability of receiving objects. Throughput will be influenced by other factors, including conveyor, separation and ultimately by the further processing in the receiving station.)

Figure 8A:
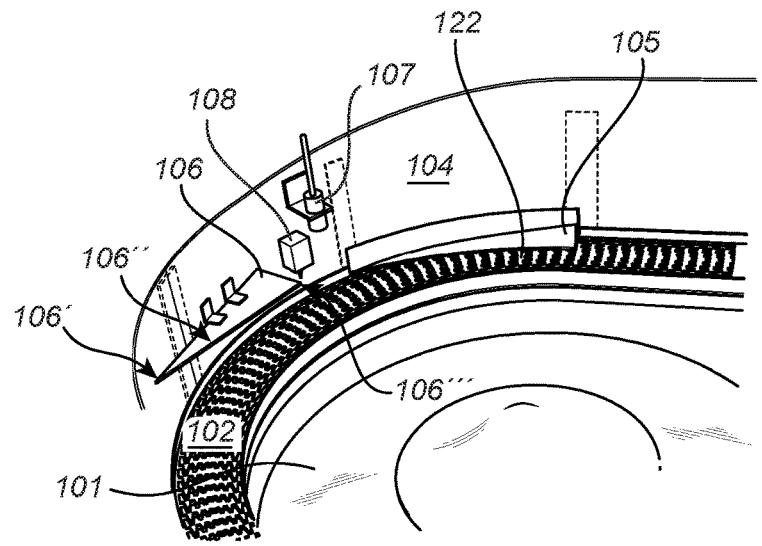
FIGS. 8a to 8f show additional mechanisms for removing improperly positioned used beverage containers from the conveyor.

FIG. 8a shows the separation section 122 in an embodiment where additional features contribute to the separation of objects. In this embodiment, a guiding device 106, here a tipper or a wing shaped guiding device is attached to the outer wall 104 at a certain height above the conveyor 102. The guiding device 106 restricts containers that are moving on the conveyor belt to be lower than the height of the guiding device 106 above the conveyor 102. Containers that are higher, e.g. containers that are standing on the conveyor belt or containers that are stacked on top of each other will be pushed inwards towards the inner edge of the conveyor by the guiding device 106 and fall back to the rotating surface 101 when the conveyor 102 moves. In more detail, it is a guiding edge 106" of the guiding device that will push or force the passing objects towards the inner edge of the conveyor. According to one example, the guiding edge 106" extends sufficiently far across the supporting surface to cause the center of mass, of an object that is to be removed from the conveyor, to pass the inner edge of the conveyor— e.g. the guiding edge extends such that only a distance equal to roughly the radius of the object is left of the supporting surface of the conveyor. Furthermore, the guiding edge 106" may e.g. be straight or curved. The guiding device 106 may also be formed e.g. as a rod extending across the supporting surface of the conveyer, the rod being e.g. straight or curved. In essence, the guiding device may have any shape, which forces the passing object of a certain height towards the inner edge of the conveyor.

The height of the guiding device 106, i.e. the distance between the supporting surface and the front edge 106', can be chosen as a compromise between the length of the shortest objects that can stand on the conveyor 102, which are to be forced off the conveyor, and the objects with the largest diameter, which are to be allowed to pass provided e.g. they are lying down and are aligned with the direction of movement of the conveyor. If the device is designed to handle objects where some are shorter than the largest diameter additional devices may be required.

Figure 8B:
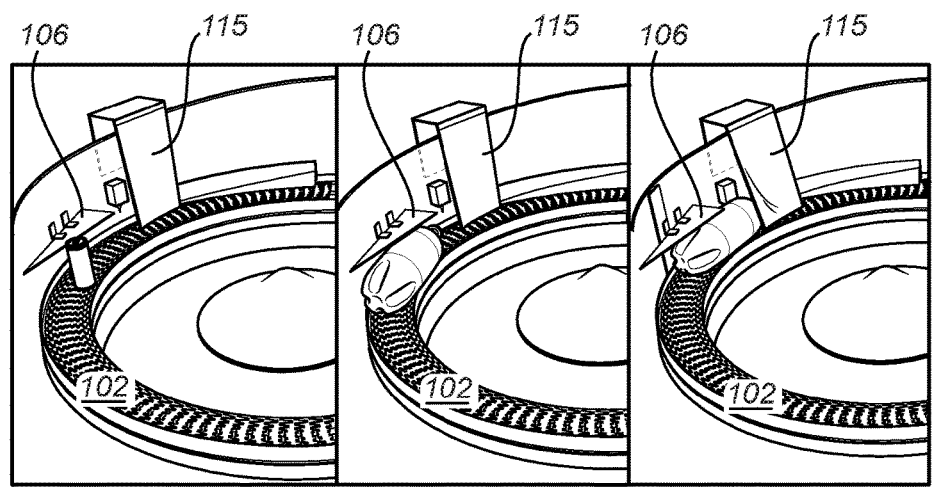
Figure 8C:
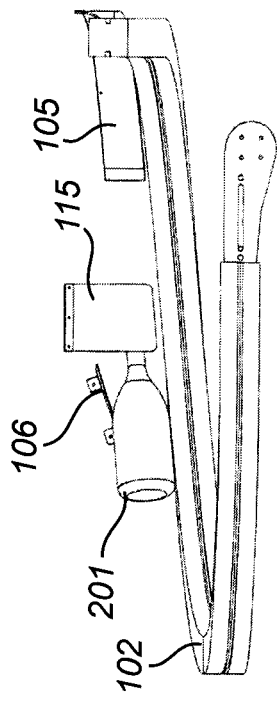

Additionally, the guiding edge may be inclined with respect to the supporting surface of the conveyor, as is more clearly seen in FIG. 8c. The guiding edge may e.g. have an inclination (φ □relative to the conveyor. The inclination may e.g. between 0.1° and 40° relative the conveyor, or between 10° and 30° relative the conveyor, or between 20° and 25° relative the conveyor. The angle of the guiding edge may be adjustably mounted on the device.

FIG. 8b shows some of the features illustrated in FIG. 8a, but with the addition of a retaining element 115, here a curtain. This retaining element or curtain 115 may be positioned immediately after the wing shaped guiding device 106. The function of the curtain 115 is to force objects with diameter larger than the height at which the guiding device 106 is positioned to remain on the conveyor 102 even when the guiding device 106 pushes such objects outwards. Standing objects will not be influenced by the curtain 115 because they will be pushed off the conveyor by the guiding device 106 before reaching the curtain 115. The curtain 115 can be made from a flexible material, such as rubber. Length, width, thickness, stiffness and weight of the material must be determined as design parameters dependent on the objects for which the system is designed to handle. Returning now to FIG. 8a, if the objects to be handled by the device includes metal objects, such as for example beverage cans, a metal sensor 107, can be used for detection. This metal detector 107 can be arranged at a certain height above the conveyor 102 in order to detect metal objects that reach this height because they are standing or because they are stacked on top of other objects. The sensitivity of the detector must be adjusted in order to prevent it from detecting metal objects that are properly placed on the conveyor 102. An air nozzle 108 may be controlled based on detection of an object by the metal detector 107. When a metal object is detected the air nozzle 108 can be activated to eject air to force the detected metal container inwards, off the conveyor 102 and back onto the rotating surface 101.

Figure 8E:
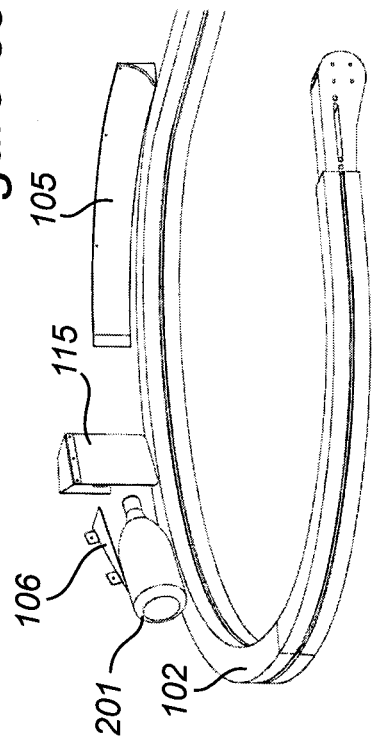
Figure 8D:
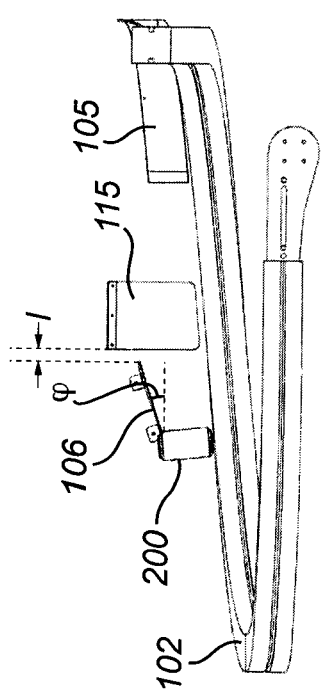

FIGS. 8c and 8d show, respectively, a schematic side view and schematic perspective view of an embodiment similar to the one in FIG. 8b. A used beverage container in the form of a can 200 is standing vertically upright on the conveyor 102. The top of the can 200 is at level with the front edge 106' of the guiding device 106 arranged above the conveyor 102. The guiding device 106 has a planar and triangular shape and is inclined at an angle φ relative to the conveyor 102. The angle φ can be adjustable. The function of the guiding device 106 device is to push vertically standing containers off the conveyor 102 as they are transported forward. The containers that pass below the guiding device 106 remain on the conveyor 102.

A retaining element 115 in the form of a curtain is positioned after the guiding device 106 in the direction of intended movement of the conveyor 102. In FIGS. 8c and 8d, the curtain 115 is arranged a distance 1 away from the guiding device 106. It should be noted that the distance 1 can be zero or negative, meaning that the curtain 115 and the guiding device 106 are overlapping. The curtain 115 can help guide containers, which should remain on the conveyor 102 but are about to fall off, back onto the conveyor 102.

A guiding element 105 is arranged still further along in the direction of intended movement of the conveyor 102. The guiding element 105 is further described in connection with for example FIG. 6e.

Figure 8F:
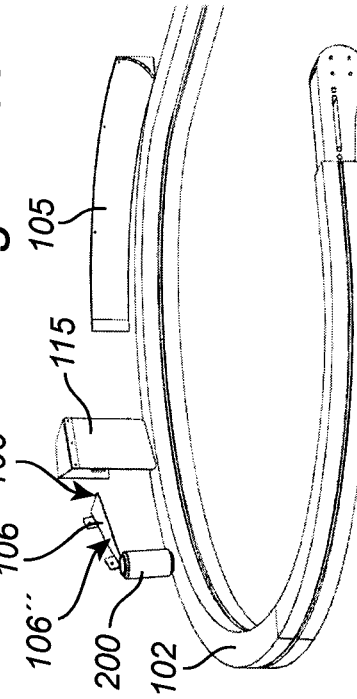

FIGS. 8e and 8f are similar to FIGS. 8c and 8d. However, in these figures, the container is a bottle 201. The bottle 201 is lying on the container 102, whereby the bottle 201 can pass through below the guiding device 106. If the bottle 201 had been vertically standing, it would have been pushed off the conveyor by the guiding device 106. As can be seen in the figures a back end 106''' of said guiding edge is arranged sufficiently high above the supporting surface of said conveyor to let a used beverage container, which is lying down and which has the largest diameter the device is adapted to handle, pass beneath it. In other words, this portion of the guiding edge has no effect on the passing containers. As the back end of the guiding edge has no effect on the passing containers, in an alternative embodiment the guiding edge is arranged substantially parallel with the supporting surface of the conveyor; and instead made so short that it e.g. ends at the position where the smallest standing containers are forced off the conveyor.

Figure 9:
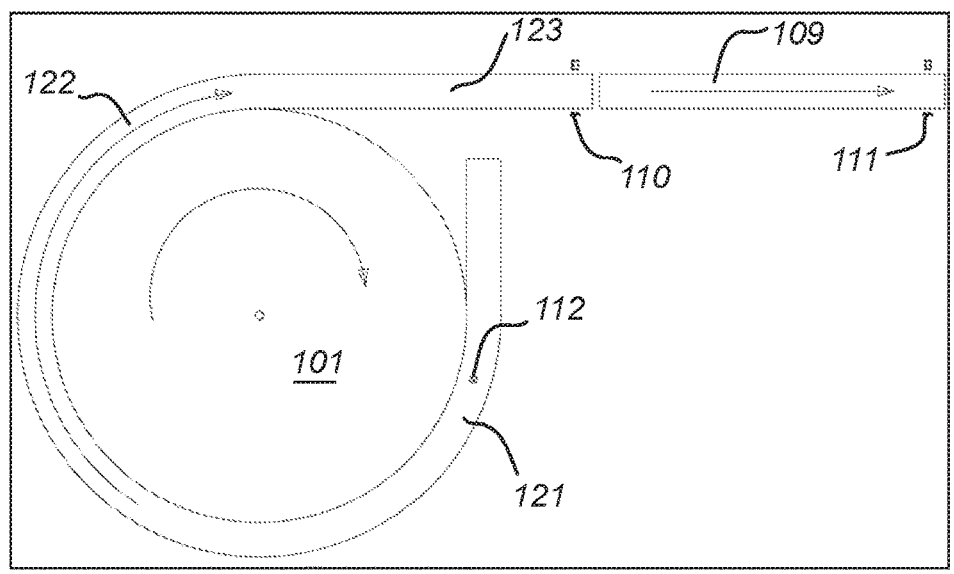
FIG. 9 shows an arrangement of sensors.

Reference is now made to FIG. 9, which is a top view of an embodiment illustrating an arrangement of sensors used to control the motion of the rotating surface 101 and the conveyor 102. As described above a conveyor 102 is arranged to at least partially encircle a rotating surface 101. The conveyor as shown in this exemplary embodiment includes a first section which is an entry section 121 where objects can leave the rotating surface 101 and enter the conveyor 102, and a second section which is a separation section 122. A third section 123 is arranged substantially tangentially with respect to the periphery of the rotating surface 101 and transports objects away from the rotating surface 101 and toward a receiving station (not shown) for further processing. In this embodiment an additional section which is a second conveyor 109 is arranged to receive objects from the first conveyor 102 and transport them further toward the receiving station. The second conveyor 109 may include a conveyor belt where the cross-section of the belt has a V-shaped form to help stabilize objects on the belt. Alternatively, or in addition, walls (not shown) may be provided along the sides of the second conveyor 109 to prevent objects from falling off.

A control system may be configured to receive signals from a number of sensors and to control the speed of the rotating surface 101 and the conveyors 102, 109. By doing this, the flow of objects on the conveyors 102, 109 can be controlled, allowing the objects to be aligned one by one before being transported to the receiving station. The control system may therefore be connected to the first motor that drives the rotating surface 101 and the second motor that drives the conveyor 102. In embodiments with a second conveyor 109, a third motor driving the second conveyor 109 may also be controlled by the control system.

The control system may be designed to provide a flow of objects from the entry of the objects on to the rotating surface 101, to first conveyor 102 and on to the second conveyor 109. Each motor may be controlled individually by the control system. The control system may be configured to adjust the speed of the motors individually in order to achieve a preferred spacing of the objects before they are delivered to the receiving station. The spacing between the objects can be obtained by the use of frequency inverters to adjust the speed of the motors.

The control system can be activated by an additional sensor (not shown) which detects input of objects onto the rotating surface 101. Alternatively the control system can be activated manually. If the rotating surface is allowed to start before the conveyor, objects will be distributed more evenly on the surface by the time the conveyor 102 starts. A delay of for example 5 seconds may therefore be chosen between the start of the rotating surface 101 and the start of the conveyor 102.

When objects have been placed on top of the rotating surface, the rotation will cause objects to be distributed evenly over the rotating surface 101 and to leave the rotating surface 101 and enter the conveyor 102 somewhere in the entry section 121. The rate at which objects are transported by the device will depend on the capacity of the receiving station to receive object. When objects are first delivered to the device and the rotating surface 101 and the first conveyor 102 starts, it can be assumed that no objects are already on any of the conveyors, and the first conveyor 102 may operate at a high speed, $M_2$ m/sec, to transports objects toward a sensor 110. Sensor 110 is located at or near the end of the third section 123 of the first conveyor 102 in order to detect objects that are ready to be transferred to the second conveyor 109. When an object is detected by sensor 110 the control system may reduce the speed of the first conveyor to $M_1$ m/sec to achieve a preferred spacing between the objects.

In some embodiments, the speed of the first conveyor can be adjusted according to the distance between objects. If the distance between the objects is determined to be large (based on the capacity of the receiving station), for example more that. 0.25 sec, the speed of the first conveyor may again be increased to $M_2$ m/sec.

It will be understood that it is the capacity of the receiving station in terms of number of objects received per unit time that is decisive, and not the distance between objects as such. However, it may be advantageous to ensure that objects are not brought closer together on the second conveyor 109 than they were on the first conveyor 102 in order to avoid that they interfere with each other. Consequently, the second conveyor 109 may be configured to transport objects forward at a speed which is at least as high as $M_1$ m/sec, and perhaps faster. The receiving station may be configured to provide a signal to the control system indicating whether it is ready to receive objects or not. In the absence of a ready signal, the second conveyor 109 may stop when an object is detected by a second sensor 111 at or near the end of the second conveyor 109. Similarly, if the second conveyor 109 has stopped the first conveyor may stop when an object is detected by the first sensor 110. Finally, while not strictly necessary, the rotating surface 101 may be stopped if the first conveyor 102 is stopped. It may, however, be desirable to allow the surface 101 to continue to rotate even if the first conveyor 102 is not moving, because this may contribute to rearrange or redistribute the objects that remain on the surface 101.

It will be understood by those with skill in the art that a number of modifications to this scheme are possible and consistent with the principles of the invention. For example, the control system may be capable of running not only the first conveyor 102, but also the second conveyor 109 at different speeds. This may be used to respond to variable capacity of the receiving station, for example depending on the combination of different types of objects delivered to the device, e.g. in terms of type of material, range of sizes etc. Also, in some embodiments the conveyors may run not only at a discrete number of fixed speeds (for example two or three), but at variable speeds.

A third sensor 112 detects objects as they enter on to the first conveyor from the rotating surface. If no objects are detected by the third sensor 112 within a certain time, for example 3 seconds, the control system may speed up the motor driving the rotation of the rotating surface 101, forcing the objects to be pushed outward. If still no objects are detected within a given time frame the control system can reduce the speed or stop the rotation of the rotating surface 101, and the device may go into a power saving mode.

Figure 10:
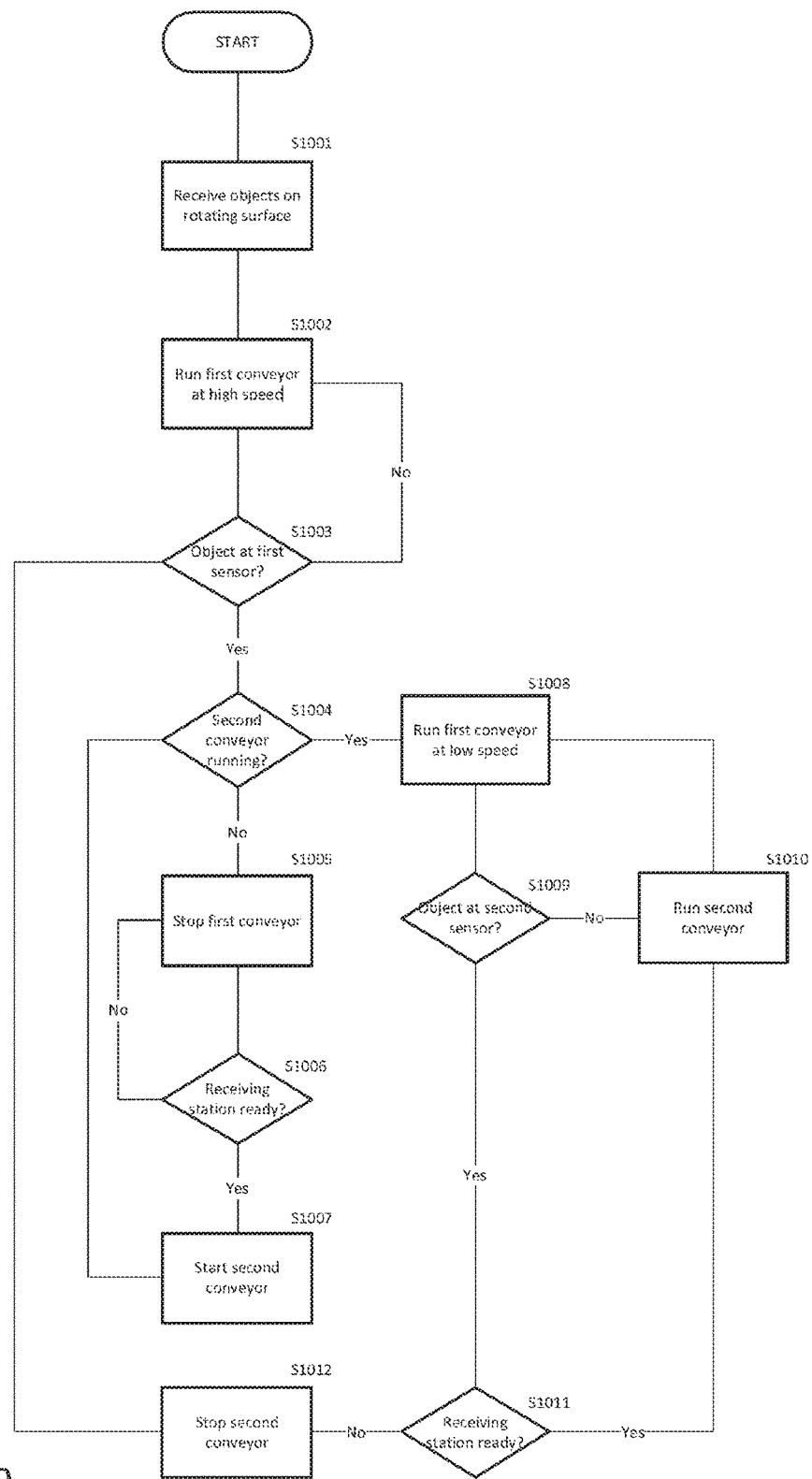
FIG. 10 is a flow chart for a control system according to an embodiment of the invention.
Figure 11:
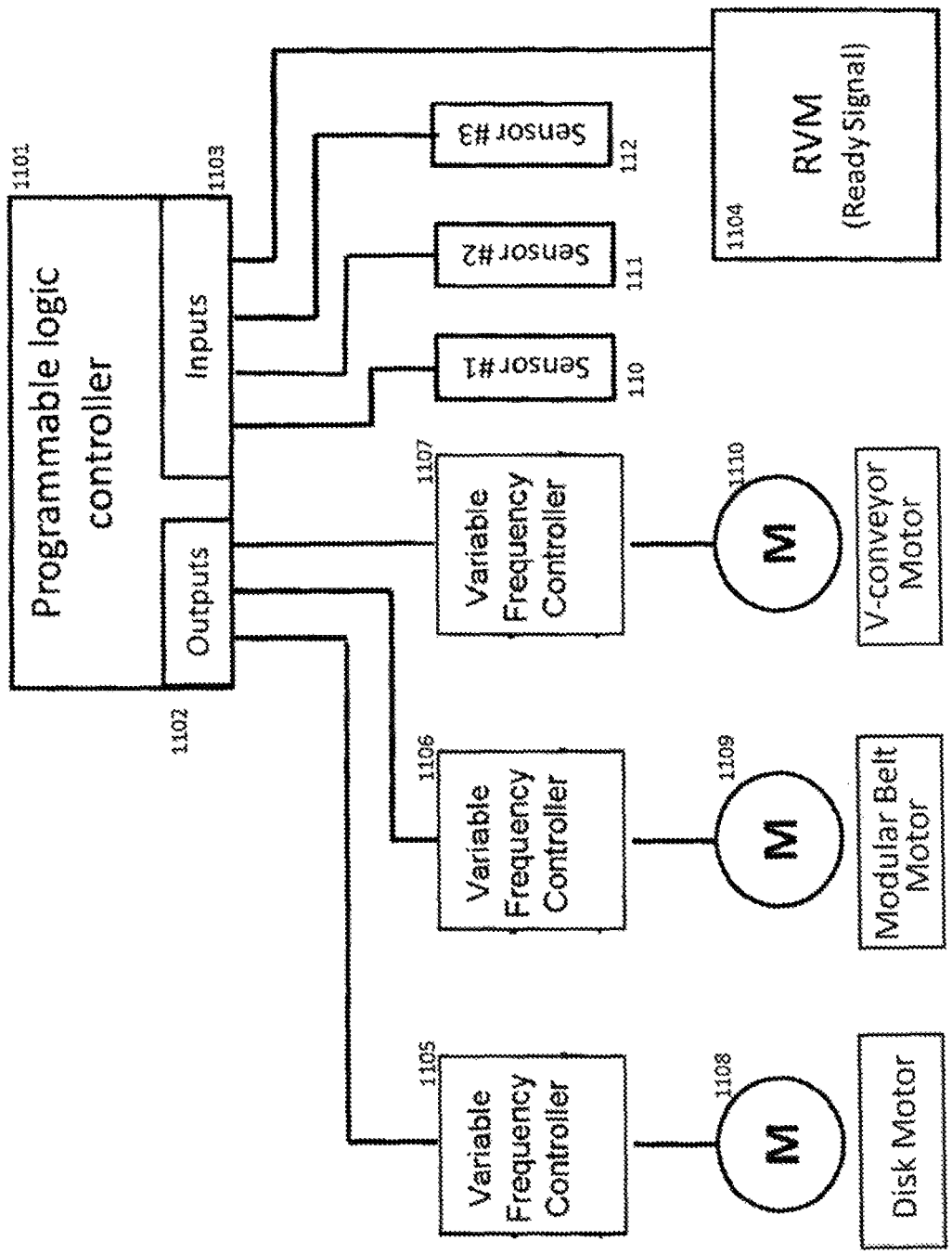
FIG. 11 is a control system according to an embodiment of the invention.

Reference is now made to FIG. 10, which shows a flow chart of how a control system consistent with the principles of the invention may operate. It should, however, be noted that while the flowchart illustrates this operation as a sequence of steps, the actual operation of the control system may be based more on a number of states in which the system may be and between which the system may switch. The following description is therefore intended to be illustrative, and should not be interpreted as limiting, particularly not in terms of the sequence in which the steps or determinations are performed. After the system is first started objects, for example used beverage containers, are received on the rotating surface in step S1001. The rotating surface 101 may, of course, already be rotating, or it may be started as a result of the loading of objects.

In a following step S1002 the first conveyor 102 is run at high speed $M_2$. As with the rotating surface 101, the conveyor may already be running, or it may be started as a result of the loading of objects or the starting of the rotating surface 101.

The rotation of the rotating surface 101 results in objects being transferred to the first conveyor 102 and transported towards the first sensor 110. In step S1003 it is determined whether an object has reached the first sensor 110. If not, the first conveyor 102 keeps running at high speed as described in step S1002. However, when an object is detected by the first sensor 110 it is determined whether the second conveyor 109 is running (or, the first time an object is detected by the first sensor the second conveyor may be started as a result of the detection). If the second conveyor 109 is not running, typically because the receiving station is not ready and there is already an object at the second detector 111, the first conveyor 102 is stopped in step S1005 until it can be determined in step S1006 that the receiving station is ready to receive objects (or that there no longer is an object at the second sensor 111, for example because it has been removed manually). When this is the case the second conveyor is started in step S1007, and the process returns to step S1004.

When it is determined in step S1004 that the second conveyor S1004 has started, the speed of the first conveyor 102 may be reduced in step S1008 and objects are delivered from the first conveyor 102 to the second conveyor 109. The process then moves to step S1009 where it is determined whether an object is detected at the second sensor 111. If this is not the case the second conveyor 109 keeps running, as illustrated in step S1010 and the first conveyor 102 keeps running at low speed as shown in step S1008 until an object is detected at the second sensor in step S1009.

When an object is detected at step S1009 it is determined in step S1011 whether the receiving station is ready to receive objects. If this is the case the process returns to steps S1008 and S1006 and objects keep being forwarded to the receiving station until a situation arises where there is an object at the second sensor, as determined in step S1009 but the receiving station indicates, as determined in step S1011, that it is not ready to receive objects. This causes the second conveyor to stop as shown in step S1012. It may, however, not be necessary to stop the first conveyor 102 immediately. So the process returns to step S1003 to determine whether there is an object at the first sensor 110. If not the second conveyor may keep running. At this time the first conveyor may run at high speed again, as shown in step S1002, until an object is detected at the first sensor 110 in step S1003. When an object is detected at the first sensor 110 in step S1003, the process returns to step S1004 and if the second conveyor has not yet started again, the first conveyor is stopped in step S1005. When it is determined in step S1006 that the receiving station again is ready to receive object, the second conveyor starts again in step S1007, and the process continues as already described.

The process may continue until the device is turned off manually, until it is detected that there are no more objects on the rotating surface, and/or after a timeout, for example when no objects have been detected by the third sensor 112 for a set period of time.

A number of modifications can, of course, be made to the process described with reference to FIG. 9. For example, after the speed of the first conveyor has been reduced in step S1008, it may again be increased if no object has been detected by the first sensor for a set period of time. Also, the speed of the rotating surface 101 may be controlled independently of the steps illustrated in the drawing, for example by increasing the speed of rotation if no object has been detected by the third sensor 112 for a set period of time.

As already mentioned, the flow chart illustrated in FIG. 10 can also be described as a number states and transitions between states. The following table shows the conditions for the various states the two conveyors and the rotating surface can be in, in accordance with an embodiment of the invention.

TABLE 1

States of the conveyors and the rotating surface

|  | Stop | Nominal speed | High speed |
|---|---|---|---|
| First conveyor: | Object at first sensor AND second conveyor not running | Object at first sensor (before timeout) AND second conveyor running | No object at first sensor (since timeout) |
| Second conveyor: | Object at second sensor AND receiving station not ready | No object at second sensor OR receiving station ready | N/A |
| Rotating surface: | System idle | Object at third sensor (before timeout) | No object at third sensor (since timeout) |

The table shows that the first conveyor stops if there is an object at the first sensor 110 and the second conveyor 109 is not running. If there is an object at the first sensor 110 (are at least that there has been within a timeout period) and the second conveyor is running the first conveyor 102 runs at nominal speed $M_1$. If there is no object at the first sensor 110 (and has not been within a timeout period) the first conveyor 102 runs at high speed $M_2$.

The second conveyor 109 stops if there is an object at the second sensor 111 and the receiving station is not ready. If the receiving station is ready, or if there is no object at the second sensor, the second conveyor 109 runs at nominal speed. According to this example there is no high speed for the second conveyor, but the nominal speed should be faster than the nominal speed for the first conveyor if it is desirable to achieve distance between objects in order to avoid that objects interfere with each other.

While the examples above have been described with respect to an embodiment with two conveyors and three sensors, other embodiments are consistent with the principles of the invention. For example, if only one conveyor is used, there may be a sensor at the end of this conveyor, and the control system will stop the conveyor if there is an object present at the end of the conveyor and a signal is received from the receiving station indicating that the receiving station is not ready to receive objects. The control system may also control the conveyor to run at a higher speed if no object has been present at the end of the conveyor for a predetermined period of time.

In some embodiments there may be no sensor in the first section, and the rotating disc will then not be controlled based on detection of objects in this first section.

The rotating surface may stop when the system is idle. When the system is started, and as long as there are objects at the third sensor (or has been within a timeout period) the surface rotates at nominal speed. If there has been no object at the third sensor within a timeout period (and the system has not returned to an idle state) the rotating speed of the surface may be increased in order to push remaining objects towards the first conveyor.

Turning now to FIG. 10, a block diagram is provided illustrating the various modules and components that may be included in a control system operating in accordance with the invention. According to this embodiment, a programmable logic controller 1101 includes output 1102 and input 1103 circuits. The input circuits 1103 receive signals from the sensors 110, 111, 112 described above, as well as a ready signal from the receiving station 1104, which may for example be a reverse vending machine (RVM).

The programmable logic controller 1101 may be programmed to operate in accordance with the method described above with reference to the flow chart in FIG. 10 and table 1. Based on this, control signals are delivered over the output circuits 1102 to variable frequency controllers 1105, 1106, 1107, which control the operation and speed of three motors 1108, 1109, 1110 driving the rotating surface 1108, the first conveyor 102 and the second conveyor 109.

It is, of course, consistent with the principles of the invention to user other types of motors and controllers than those illustrated here, and various embodiments may also require fewer or additional motors, as explained above.

In all embodiments described above detection of objects can be performed using various types of sensors, for example optical, metal detectors, weight detectors. The selection of a preferable type (or types) of sensors may have to be based on the characteristics of the range of objects to be processed in a particular implementation. The method may be performed using a control system, for example a computerized control system, PLC or some other type of control system known in the art.

The objects may be any range of objects with dimensions and characteristics that allow them to move from a rotating disc and onto a conveyor as described, and to remain on the conveyor or be pushed or otherwise fall of if they are positioned with an improper orientation or positioned together instead of individually. Objects may include used beverage containers, used food containers, other types of containers, cans or bottles, and various objects of manufacture and produce. Consequently, the receiving station may be any type of device configured to receive such objects and process, store or sort them.

Modifications and/or additions can be made to the device as described heretofore, but these shall remain within the field and scope of the invention. For example, fewer or additional sensors than those shown in the examples can be used in alternative embodiments. Furthermore, the conveyor may have a shape around the rotating surface that differs at least somewhat from being circular. A device according to the invention may also be combined with a wide range of different arrangements for loading objects onto the rotating surface.

The invention claimed is:

1. A device for singulation of used beverage containers received in bulk into individual objects, where the used beverage containers have different shapes and sizes including a first size and a second size, which second size is larger than the first size, the device comprising:
   a rotating surface adapted to receive a plurality of said containers and distribute them towards its periphery;
   a conveyor at least partly encircling said rotating surface and adapted to receive said used beverage containers from said rotating surface and transport them away from the rotating surface, the conveyor having an inner edge, an outer edge and a supporting surface which extends between the inner and outer edges; and
   an outer wall along the outer edge of the conveyor at least along the part of the conveyor that encircles the rotating surface, whereby the conveyor is arranged between the outer wall and the rotating surface;
   wherein
   said conveyor gradually ascends such that it is lower than or substantially at the same level as the rotating surface in a first section, allowing said used beverage containers to leave the rotating surface and enter the conveyor in the first section, and such that it is at a higher level than the rotating surface in a second section, a peripheral barrier is arranged along the periphery of said rotating surface to prevent the used beverage containers from leaving the rotating surface in said second section; and
   said conveyor in at least a part of said second section is made so narrow that said containers are only able to remain on the conveyor if they are transported one by one and aligned with the direction of movement on the conveyor, and that otherwise they will fall back onto the rotating surface or onto or a conveyor leading back to the rotating surface,
   wherein a guiding device is attached to the outer wall above the conveyor in said second section above the conveyor, and has a guiding edge adapted to force objects that are standing on the conveyor inwards toward the rotating surface until they fall off the conveyor,
   wherein a distance between the guiding edge of the guiding device and the supporting surface of the conveyor increases in the intended direction of movement of the conveyor, the increase being between 0.1 and 40 degrees, the distance being measured along an axis that is substantially perpendicular to the width of the conveyor and to the intended direction of movement of the conveyor.

2. The device of claim 1, wherein the conveyor in said first section is between 30 mm higher and 50 mm lower than the rotating surface.

3. The device of claim 1, wherein the conveyor in at least a part of said second section ascends at an angle between 0.1 and 45 degrees.

4. The device of claim 1, wherein the conveyor tilts downwards in a direction radially away from the rotating surface in said first and/or second sections with an angle between 0.1 and 15 degrees.

5. The device of claim 1, wherein the used beverage containers of said first size has a diameter which is smaller than the diameter of the used beverage container of said second size, and wherein the conveyor is made narrow in at least part of said second section by a guiding element forming a narrowing wall which extends along the outer edge of the conveyor and across the conveyor so as to gradually force used beverage containers of said first size towards the inner edge of said conveyor.

6. The device of claim 5, wherein the guiding element comprises a minor wall, which reduces the width of the conveyor so much that two containers of the first size cannot pass side by side between the minor wall and the inner edge of the conveyor.

7. The device of claim 6, wherein the minor wall is arranged in the space between the support surface of said conveyor and the outer surface of a passing used beverage container of said second size, such that said minor wall does not interact with said used beverage containers of the second size.

8. The device of claim 6, wherein the smallest distance between the minor wall and the inner edge of the conveyor is in the range from $d_{min}$ to smaller than $1.5 \times d_{min}$, the distance being measured in a direction perpendicular to the direction of motion of the conveyor and $d_{min}$ denoting a largest cross-sectional dimension of the containers of the first size.

9. The device of claim 6, wherein the guiding element comprises a surface which is integrated with the minor wall and extends from the minor wall vertically upwards towards the outer edge of the conveyor.

10. The device of claim 1, wherein a guiding edge of the guiding device extends across the conveyor, and wherein the extension of the guiding edge across the conveyor increases in the intended direction of movement of the conveyor.

11. The device of claim 10, wherein the length of the used beverage containers having a first size is shorter than or equal to the diameter of the used beverage containers having a second size, and wherein
   a front end of said guiding edge is arranged sufficiently close to the supporting surface of said conveyor to enable said guiding edge to interact with a portion of a used beverage container of said first size which is standing, and wherein
   a front end of said guiding edge is arranged sufficiently close to the supporting surface of said conveyor to make said guiding edge interact with a portion of a used beverage container of said second size which is lying down, and wherein
   a retaining element is arranged adjacent to a back end of said guiding edge, between said rotating surface said support surface of said conveyor, to guide used beverage containers of said second size which is lying down back towards the outer wall of the conveyor before said used beverage container of said second size is forced off the conveyor by said guiding element.

12. The device according to claim 1, wherein a retaining element is arranged adjacent to said guiding device at an angle between zero and 45 degrees, in order to guide objects that are pushed by the guiding device back towards the conveyor if they have not fallen off the conveyor when they reach the curtain.

13. The device of claim 12, wherein said retaining element is a curtain.

14. The device of claim 1, wherein a sensor capable of detecting used beverage containers is arranged at the end of the conveyor, and the device further comprises a control system configured to receive input from said sensor and from a receiving station, and to control the device to:
stop the conveyor if a used beverage container is detected at the end of the conveyor and the receiving station signals that it is not ready to receive used beverage containers; and
run the conveyor at nominal speed if there is no used beverage container at the end of the conveyor or the receiving station signals that it is ready to receive used beverage containers.

15. The device of claim 14, wherein the control system is further configured to run the conveyor at high speed if no used beverage container has been detected at the end of the conveyor within a predetermined time period.

16. The device of claim 14, wherein a sensor capable of detecting used beverage containers is arranged in the first section of the conveyor and the control system is further configured to run the rotating surface at high speed if no used beverage container has been detected in the first section of the conveyor within a predetermined time period.

17. The device of claim 1, where a second conveyor is arranged to receive used beverage containers from said first conveyor and transport them at a speed that is higher than the nominal speed of the first conveyor.

18. The device of claim 17, where sensors capable of detecting used beverage containers are arranged at the end of the first conveyor, and at the end of the second conveyor, and the device further comprises a control system configured to receive input from said sensors and from a receiving station, and to control the device to:
stop the first conveyor if a used beverage container is detected at the end of the first conveyor and the second conveyor is not running;
run the first conveyor at nominal speed if the second conveyor is running;
stop the second conveyor if a used beverage container is detected at the end of the second conveyor and the receiving station signals that it is not ready to receive used beverage containers; and
run the second conveyor at nominal speed if there is no used beverage container at the end of the second conveyor or if the receiving station signals that it is ready to receive used beverage containers, or both.

19. The device of claim 18, wherein the control system is further configured to run the first conveyor at high speed if no used beverage container has been detected at the end of the first conveyor within a predetermined time period.

20. The device of claim 18, wherein a sensor capable of detecting used beverage container is arranged in the first section of the first conveyor and the control system is further configured to run the rotating surface at high speed if no used beverage container has been detected in the first section of the first conveyor within a predetermined time period.

21. A method for singulation of used beverage containers received in bulk into individual objects, where the used beverage containers have different shapes and sizes, comprising:
providing a device for singulation of used beverage containers, the device comprising:
a rotating surface, a conveyor at least partly encircling said rotating surface and adapted to receive used beverage containers from the rotating surface and transport them away from the rotating surface; and
an outer wall along the periphery of the conveyor at least along the part of the conveyor that encircles the rotating surface;
wherein said conveyor includes a first section where it is capable of receiving used beverage container from the rotating surface, and a second section where used beverage containers can only be transported one by one and aligned with the direction of movement of the conveyor or otherwise fall back onto the rotating surface;
wherein a guiding device is attached to the outer wall above the conveyor in said second section above the conveyor, and has a guiding edge adapted to force objects that are standing on the conveyor inwards toward the rotating surface until they fall off the conveyor,
wherein a distance between the guiding edge of the guiding device and the supporting surface of the conveyor increases in the intended direction of movement of the conveyor, the increase being between 0.1 and 40 degrees, the distance being measured along an axis that is substantially perpendicular to the width of the conveyor and to the intended direction of movement of the conveyor;
receiving a plurality of used beverage containers on top of the rotating surface;
rotating the surface such that the used beverage containers are distributed towards the periphery of the surface and enter the conveyor in the first section;
running the conveyor such that used beverage containers that are positioned one by one and aligned with the direction of movement on the conveyor are transported away from the rotating surface and towards a receiving station, and used beverage containers that are not positioned one by one and aligned with the direction of movement on the conveyor fall back onto the rotating surface.

22. The method of claim 21, further comprising:
stopping the conveyor if a used beverage container is detected at the end of the conveyor and the receiving station signals that it is not ready to receive used beverage containers; and
running the conveyor at nominal speed if there is no used beverage container at the end of the conveyor or the receiving station signals that it is ready to receive used beverage containers.

23. The method of claim 22, further comprising:
running the conveyor at high speed if no used beverage container has been detected at the end of the conveyor within a predetermined time period.

24. The method of claim 22, further comprising:
running the rotating surface at high speed if no used beverage container has been detected in the first section of the conveyor within a predetermined time period.

25. The method of claim 21, wherein the device includes a second conveyor arranged to receive used beverage containers from said first conveyor and transport them at a speed that is higher than the nominal speed of the first conveyor towards the receiving station, the method further comprising:
stop the first conveyor if a used beverage container is detected at the end of the first conveyor and the second conveyor is not running;
run the first conveyor at nominal speed if the second conveyor is running;
stop the second conveyor if a used beverage container is detected at the end of the second conveyor and the receiving station signals that it is not ready to receive used beverage containers; and run the second conveyor at nominal speed if there is no used beverage container at the end of the second conveyor or if the receiving station signals that it is ready to receive used beverage containers, or both.

26. The method of claim 25, further comprising:

running the first conveyor at high speed if no used beverage container has been detected at the end of the first conveyor within a predetermined time period.

27. The method of 25, further comprising:

running the rotating surface at high speed if no used beverage container has been detected in the first section of the first conveyor within a predetermined time period.

* * * * *